US010814444B2

(12) United States Patent
Inutake

(10) Patent No.: US 10,814,444 B2
(45) Date of Patent: Oct. 27, 2020

(54) WORKPIECE CLAMPING DEVICE CLAMPING AND SECURING WORKPIECE

(71) Applicant: FANUC CORPORATION, Yamanashi (JP)

(72) Inventor: Hiroshi Inutake, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 135 days.

(21) Appl. No.: 15/693,683

(22) Filed: Sep. 1, 2017

(65) Prior Publication Data
US 2018/0065219 A1    Mar. 8, 2018

(30) Foreign Application Priority Data

Sep. 7, 2016    (JP) .................................. 2016-174703

(51) Int. Cl.
| | |
|---|---|
| B23Q 3/06 | (2006.01) |
| B25B 5/06 | (2006.01) |
| B25B 5/00 | (2006.01) |
| B25B 5/02 | (2006.01) |
| B25B 5/16 | (2006.01) |

(52) U.S. Cl.
CPC .............. B23Q 3/061 (2013.01); B25B 5/003 (2013.01); B25B 5/006 (2013.01); B25B 5/02 (2013.01); B25B 5/06 (2013.01); B25B 5/068 (2013.01); B25B 5/166 (2013.01)

(58) Field of Classification Search
CPC ........... B25B 5/006; B25B 5/06; B25B 11/00; B25B 5/003; B25B 5/02; B25B 5/068; B25B 5/166; B25B 5/08; B25B 1/20; B25B 1/2415; B25B 1/2421; B25B 1/2452; B25B 1/2457; B25B 1/2463; B23Q 3/061

USPC .............. 269/45, 43, 156, 136, 254 C, 266
See application file for complete search history.

(56) References Cited

U.S. PATENT DOCUMENTS

| | | | | |
|---|---|---|---|---|
| 4,583,724 A | * | 4/1986 | Huang ...................... | B25B 1/20 269/182 |
| 5,236,183 A | * | 8/1993 | Curtis ..................... | A63C 11/04 269/242 |
| 8,857,804 B2 | * | 10/2014 | Wang ....................... | G01N 3/04 269/111 |

(Continued)

FOREIGN PATENT DOCUMENTS

| | | |
|---|---|---|
| CN | 203726099 U | 7/2014 |
| CN | 203936592 U | 11/2014 |
| CN | 204893398 U | 12/2015 |

(Continued)

Primary Examiner — Tyrone V Hall, Jr.
Assistant Examiner — Abbie E Quann
(74) Attorney, Agent, or Firm — RatnerPrestia

(57) ABSTRACT

A workpiece clamping device able to clamp a first workpiece and a second workpiece placed on the first workpiece. The workpiece clamping device includes a receiving base on which the first workpiece is to be placed, a first clamping mechanism for clamping the first workpiece, and a second clamping mechanism for clamping a second workpiece placed on the first workpiece. The first clamping mechanism has a first clamp section and a second clamp section, which are provided on the receiving base so as to open and close. The second clamping mechanism has a third clamp section and a fourth clamp section, which are provided on the receiving base so as to open and close, to retain the second workpiece at a predetermined position with respect to the first workpiece.

8 Claims, 17 Drawing Sheets

(56) References Cited

U.S. PATENT DOCUMENTS

| | | | |
|---|---|---|---|
| 9,895,792 B2* | 2/2018 | Chen | ......................... B25B 1/08 |
| 2011/0024962 A1* | 2/2011 | Zhang | ...................... B25B 5/06 |
| | | | 269/107 |

FOREIGN PATENT DOCUMENTS

| | | |
|---|---|---|
| JP | S48082370 U1 | 10/1973 |
| JP | S48102682 U1 | 12/1973 |
| JP | S61061130 U | 4/1986 |
| JP | H01103678 U | 7/1989 |
| JP | 2004-009200 A | 1/2004 |
| JP | 3161128 U | 7/2010 |
| JP | 2013169642 A | 9/2013 |

* cited by examiner

FIG. 20A
FIG. 20B
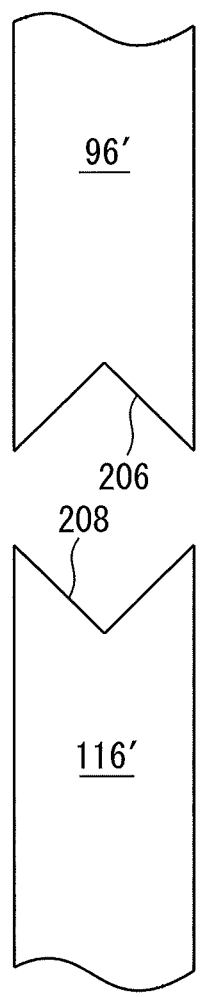
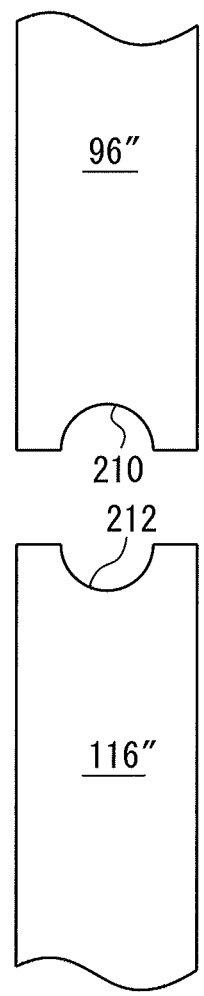
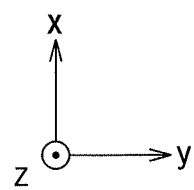

WORKPIECE CLAMPING DEVICE CLAMPING AND SECURING WORKPIECE

BACKGROUND OF THE INVENTION

1. Field of the Invention

The invention relates to a workpiece clamping device for clamping and securing a workpiece.

2. Description of the Related Art

Workpiece clamping devices for clamping and securing a workpiece have been known (see, e.g., Japanese Unexamined Patent Publication (Kokai) No. 2004-9200).

In the field of machine tools, a workpiece clamping device, which can clamp a first workpiece, and a second workpiece placed on the first workpiece, has been demanded.

SUMMARY OF THE INVENTION

A workpiece clamping device includes a receiving base on which a first workpiece is placed, and a first clamping mechanism configured to clamp the first workpiece placed on the receiving base. The first clamping mechanism includes a first clamp section and a second clamp section which are provided at the receiving base so as to open and close and which can clamp the first workpiece.

The workpiece clamping device includes a second clamping mechanism configured to clamp a second workpiece placed on the first workpiece. The second clamping mechanism includes a third clamp section and a fourth clamp section which are provided at the receiving base so as to open and close and which can clamp the second workpiece. The second clamping mechanism retains the second workpiece at a predetermined position with respect to the first workpiece.

The third clamp section may be disposed so as to slidably contact the first clamp section during the opening and closing of the third clamp section. The first clamping mechanism may include a guide provided at the first clamp section and configured to engage the third clamp section so as to guide the movement of the third clamp section.

The guide may include a groove slidably receiving the third clamp section. The first clamping mechanism may further include a first biasing section configured to bias at least one of the first clamp section and the second clamp section in an opening direction.

The workpiece clamping device may further include a cam mechanism configured to move the first clamp section or the second clamp section biased by the first biasing section in a closing direction, by an external force applied to the first clamp section or the second clamp section in a direction intersecting with the opening and closing direction of the first clamp section or the second clamp section.

The cam mechanism may include an inclined surface formed at the first clamp section or the second clamp section biased by the first biasing section so as to be inclined with respect to the opening and closing direction of the first clamp section or the second clamp section.

The second clamping mechanism may further include a second biasing section configured to bias at least one of the third clamp section and the fourth clamp section in a closing direction; and a movement restriction section configured to disengageably engage the third clamp section or the fourth clamp section biased by the second biasing section when the third clamp section and the fourth clamp section are opened.

The movement restriction section may restrict the movement of the third clamp section or the fourth clamp section in the closing direction when engaging the third clamp section or the fourth clamp section, while allowing the third clamp section or the fourth clamp section to move in the closing direction by the action of the second biasing section when disengaging from the third clamp section or the fourth clamp section.

BRIEF DESCRIPTION OF THE DRAWINGS

The above-mentioned or other objects, features, and advantages of the invention objects, features, and advantages will be clarified from the detailed description of embodiments illustrated in the accompanying drawings, in which:

FIG. 20A is a top view of a clamp section according to still another embodiment; and FIG. 20B is a top view of a clamp section according to still another embodiment.

DETAILED DESCRIPTION

Figure 1:
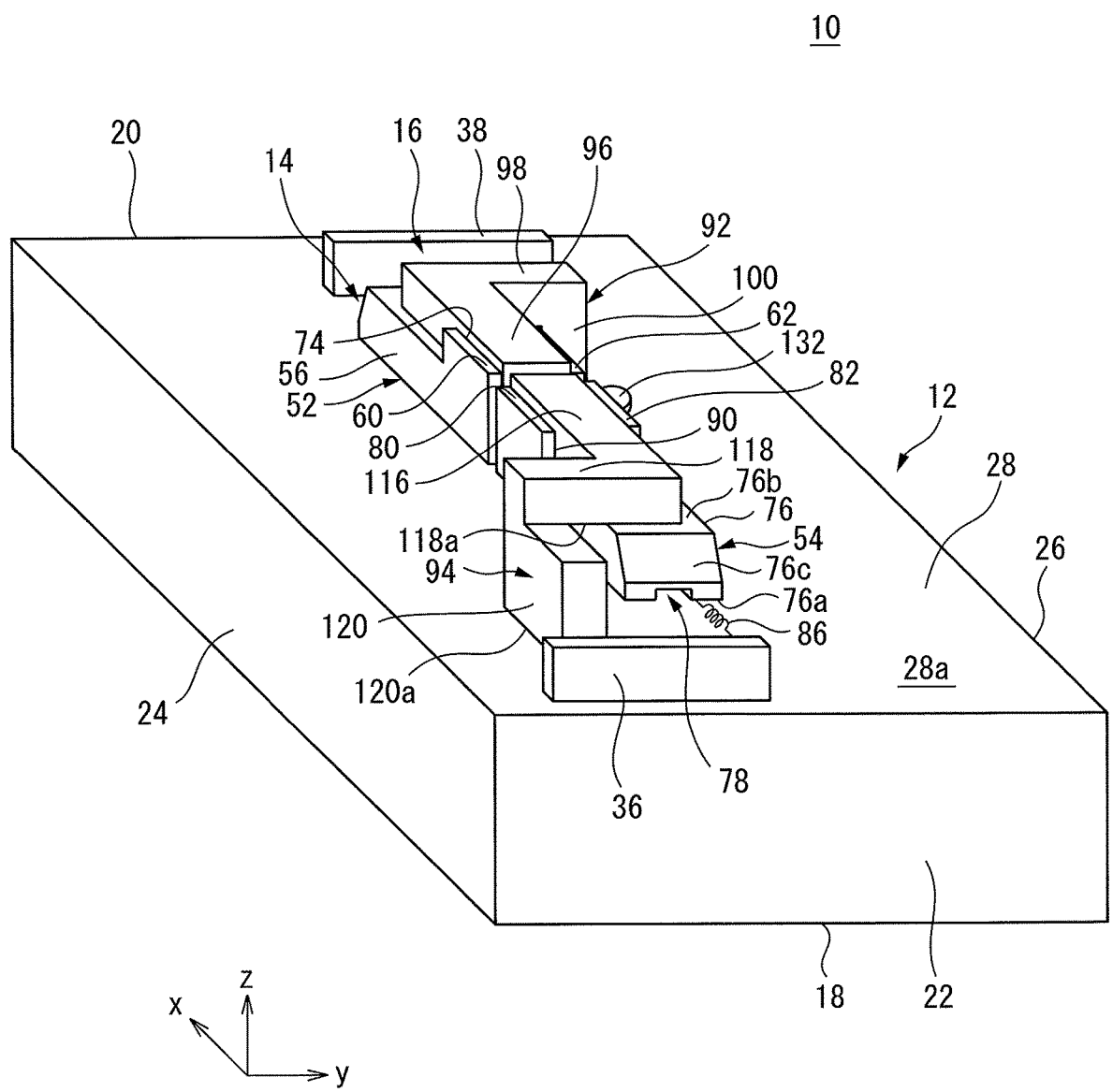
FIG. 1 is a perspective view of a workpiece clamping device according to an embodiment.

Embodiments of the invention will be described below in detail with reference to the accompanying drawings. Note that, in the various embodiments described below, similar elements are assigned the same reference numerals, and repetitive descriptions thereof will be omitted. Further, in the following description, the orthogonal coordinate system in the drawings is used as a standard of directions, and for convenience, the x-axis positive direction is referred to as the frontward direction, the y-axis positive direction is referred to as the rightward direction, and the z-axis positive direction is referred to as the upward direction.

Figure 2:
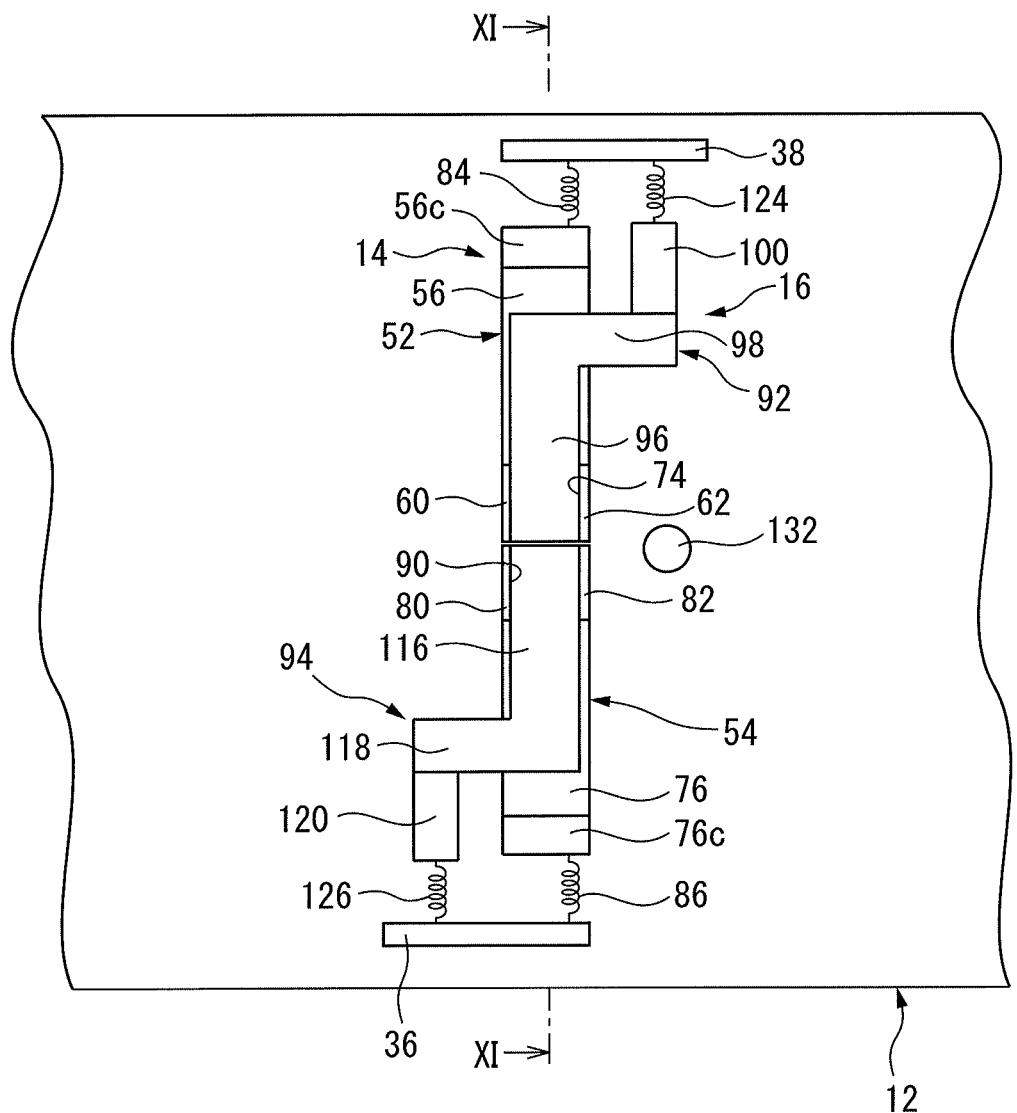
FIG. 2 is a top view of the workpiece clamping device shown in FIG. 1.

With reference to FIGS. 1 to 11, a workpiece clamping device 10 according to an embodiment of the invention will be described. As shown in FIGS. 1 and 2, the workpiece clamping device 10 includes a receiving base 12, a first clamping mechanism 14, and a second clamping mechanism 16.

Figure 3:
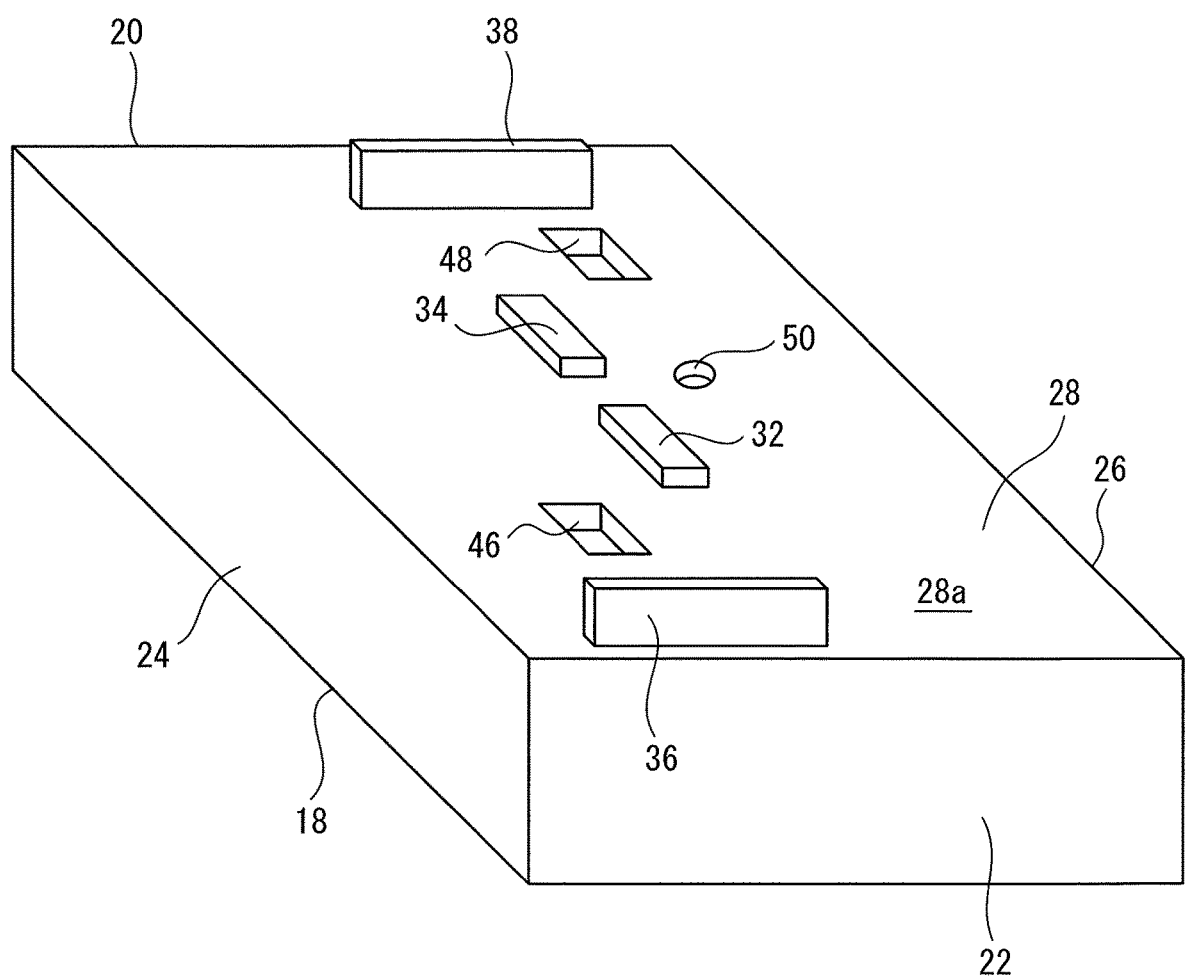
FIG. 3 is a perspective view of a receiving base shown in FIG. 1.
Figure 4:
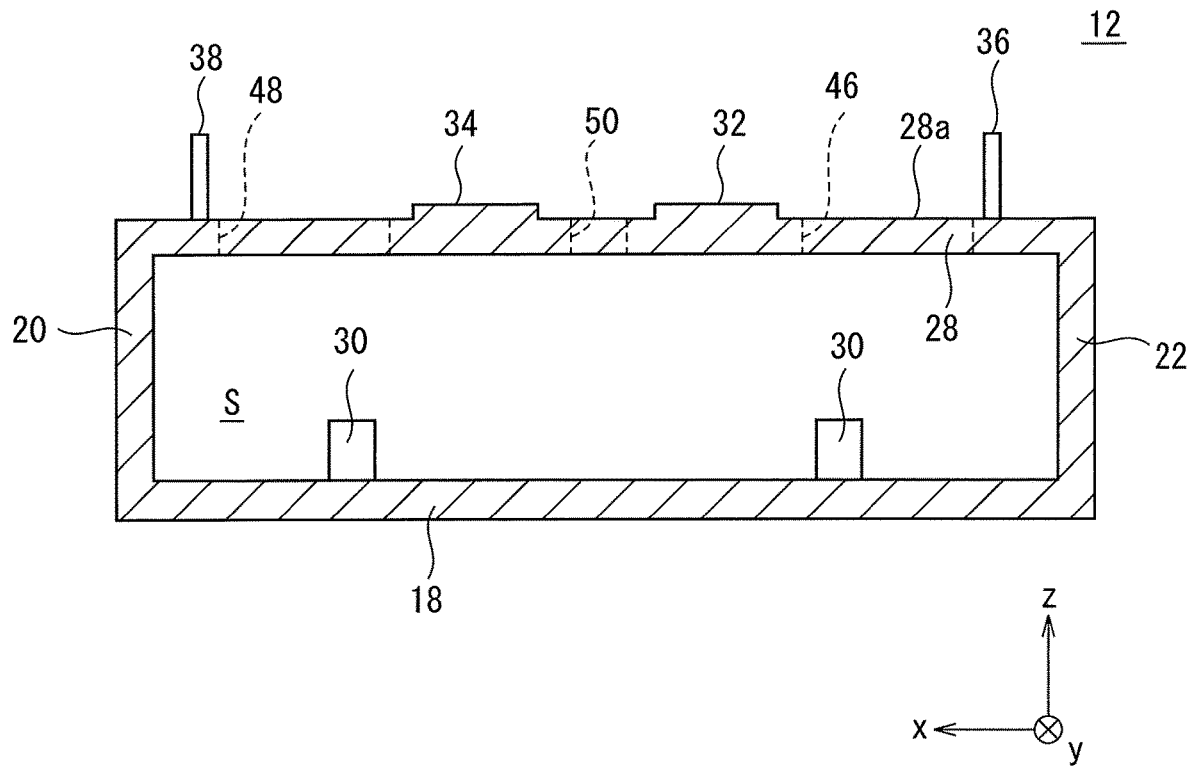
FIG. 4 is a cross-sectional view of the receiving base shown in FIG. 3 cut along the x-z plane in FIG. 3.

As shown in FIGS. 3 and 4, the receiving base 12 is a hollow member, and includes a bottom wall 18, a front wall 20, a rear wall 22, a left wall 24, a right wall 26, and a top wall 28. The bottom wall 18 is a substantially rectangular plate member. The bottom wall 18 is formed with a plurality of shafts 30 projecting upward from the bottom wall 18.

The front wall 20 and the rear wall 22 extend upward from the front edge and the rear edge of the bottom wall 18 respectively so as to be opposite to each other. The left wall 24 and the right wall 26 extend from the left edge and the right edge of the bottom wall 18 respectively so as to be opposite to each other, and extend between the front wall 20 and the rear wall 22.

The top wall 28 is connected to the top edges of the front wall 20, the rear wall 22, the left wall 24, and the right wall 26. A first workpiece described later is placed on a top surface 28a of the top wall 28. The bottom wall 18, the front wall 20, the rear wall 22, the left wall 24, the right wall 26, and the top wall 28 define an internal space S of the receiving base 12.

Through-holes 46, 48, and 50 are formed at the top wall 28. The through-holes 46 and 48 are slots extending in the x-axis direction, and are spaced from each other in the x-axis and y-axis directions. The through-hole 50 is a substantially circular hole, and is disposed rearward of the through-hole 48.

The receiving base 12 further includes guide rails 32 and 34 and spring retaining sections 36 and 38. The guide rails 32 and 34 project upward from the top surface 28a of the top wall 28, and linearly extend in the x-axis direction. The guide rail 32 is arranged so as to separate rightward from the through-hole 46, while the guide rail 34 is arranged so as to separate leftward from the through-hole 48.

Figure 5:
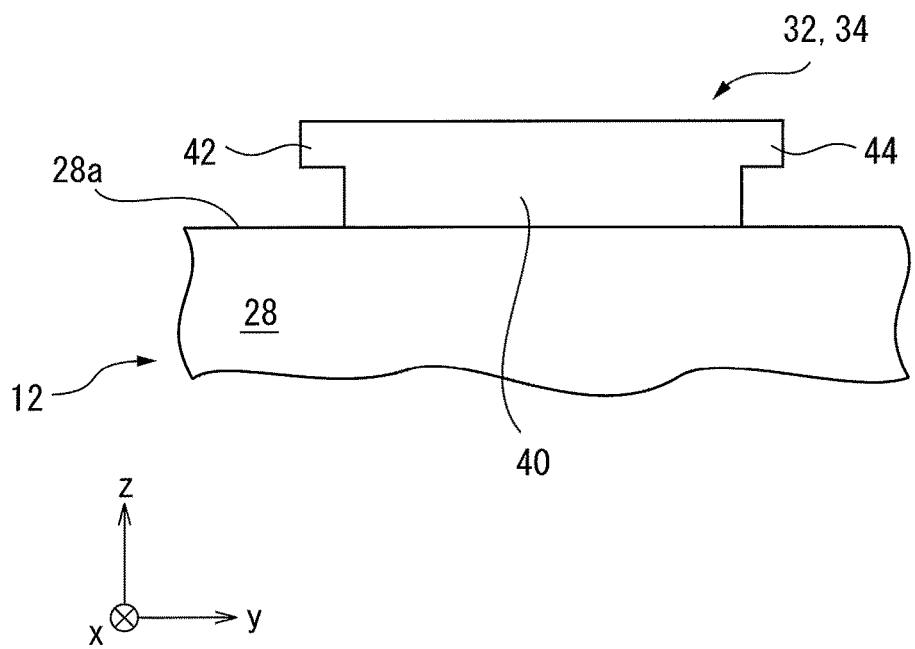
FIG. 5 is an enlarged view of a guide rail shown in FIG. 3 as seen from the x-axis direction in FIG. 3.

The guide rails 32 and 34 are disposed at the same position in the y-axis direction, and are spaced from each other in the x-axis direction. As shown in FIG. 5, each of the guide rails 32 and 34 includes a rail 40 and flanges 42 and 44 laterally extending from the upper end of the rail 40.

The spring retaining sections 36 and 38 project upward from the top surface 28a of the top wall 28. The spring retaining section 36 is arranged adjacent to rear side of the guide rail 32 and the through-hole 46, while the spring retaining section 38 is arranged adjacent to front side of the guide rail 34 and the through-hole 48.

Referring again to FIGS. 1 and 2, the first clamping mechanism 14 includes a pair of clamp pawls 52 and 54 arranged to align in the x-axis direction. The clamp pawls 52 and 54 are arranged on the top wall 28 so as to open and close. In this embodiment, the clamp pawls 52 and 54 are movable with respect to the top wall 28, and the clamp pawl 52 is disposed frontward of the clamp pawl 54.

Figure 6:
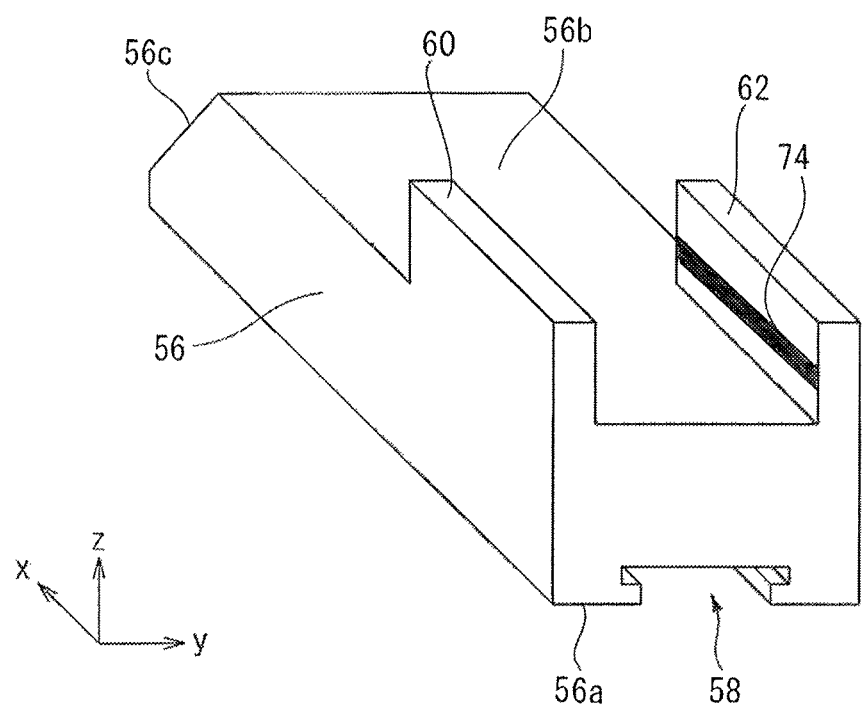
FIG. 6 is an enlarged perspective view of one of a pair of clamp pawls shown in FIG. 1.
Figure 7:
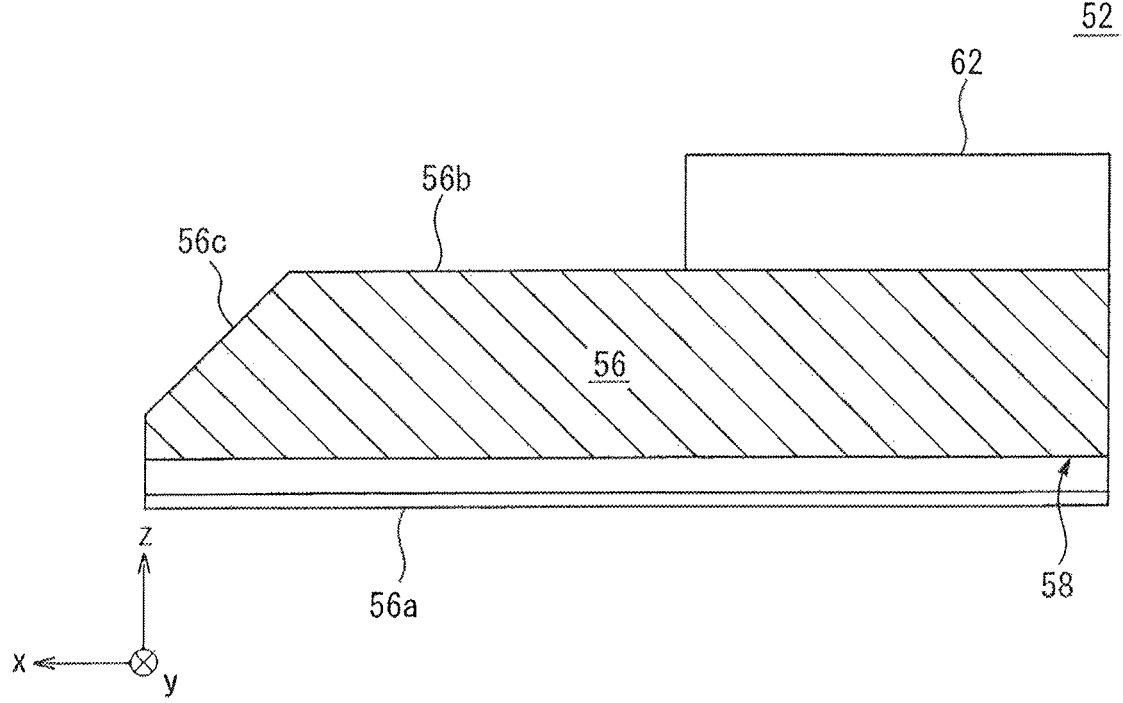
FIG. 7 is a cross-sectional view of the clamp pawl shown in FIG. 6 cut along the x-z plane in FIG. 6.

As shown in FIG. 6, the clamp pawl 52 includes a clamp section 56 (first clamp section) extending in the x-axis direction, a recess 58 formed to be recessed inward from a bottom surface 56a of the clamp section 56, and a pair of guide walls 60 and 62 projecting upward from a top surface 56b of the clamp section 56 so as to be opposite to each other. An inclined surface 56c is formed at the front end of the clamp section 56 so as to be inclined with respect to the x-axis direction.

Figure 8:
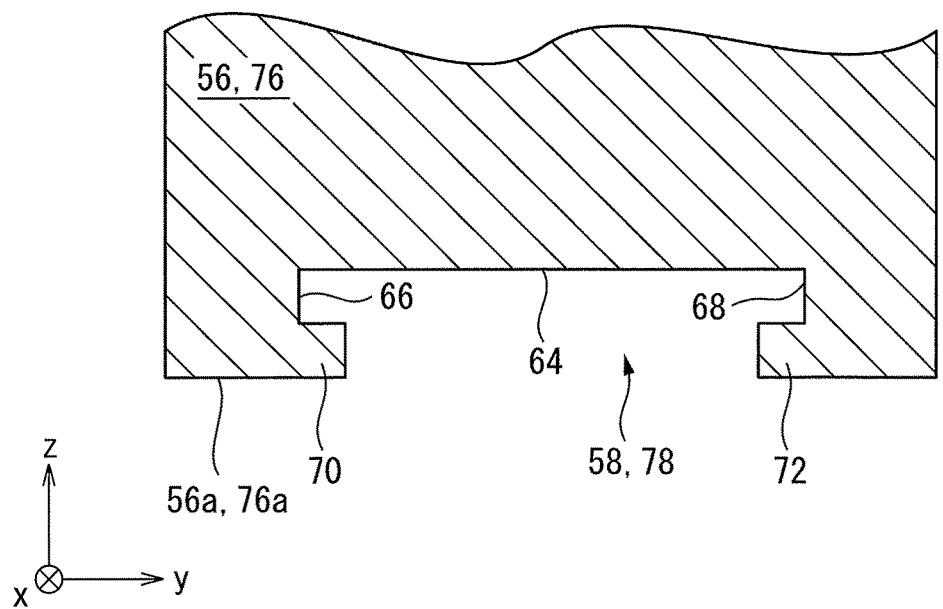
FIG. 8 is an enlarged cross-sectional view of a recess formed at the bottom surface of the clamp pawl shown in FIG. 6.

As shown in FIG. 8, the recess 58 is defined by an end face 64 substantially parallel to the bottom surface 56a, end faces 66 and 68 extending downward from the end face 64 so as to be opposite to each other, and pawls 70 and 72 projecting inward from the end faces 66 and 68, respectively.

Figure 9:
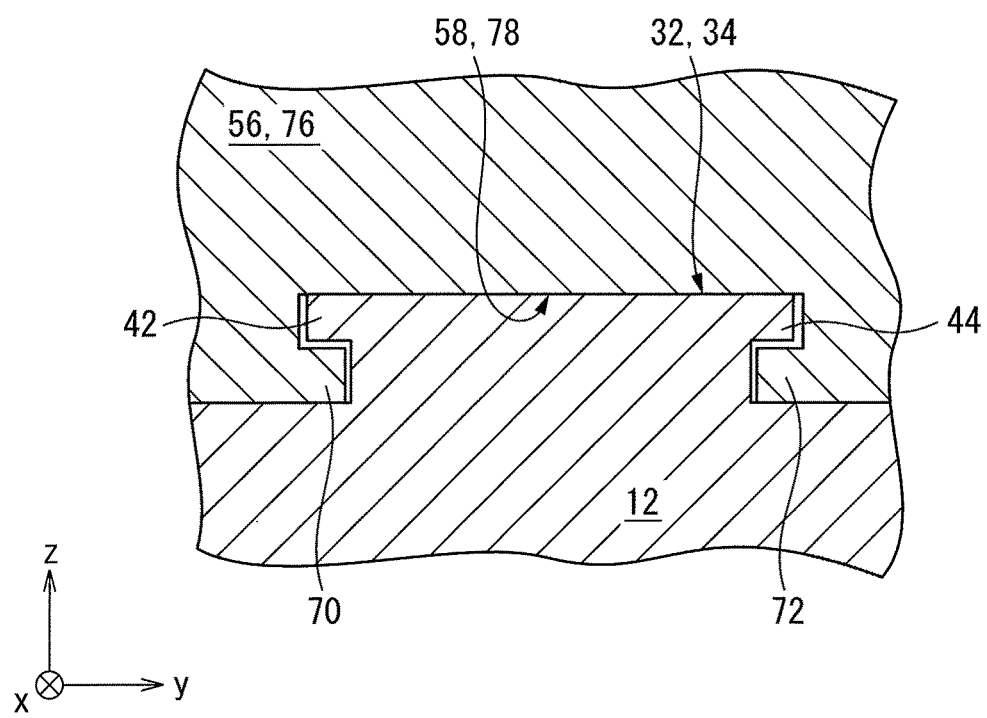
FIG. 9 is an enlarged cross-sectional view showing that the clamp pawl shown in FIG. 8 engages the guide rail shown in FIG. 5.

When the clamp pawl 52 is disposed on the receiving base 12, as shown in FIG. 9, the guide rail 34 provided on the receiving base 12 is slidably received in the recess 58. At this time, the flanges 42 and 44 of the guide rail 34 engage the pawls 70 and 72 provided at the clamp pawl 52.

Due to this structure, the clamp pawl 52 is guided by the guide rail 34 so as to be able to move in the x-axis direction, while the clamp pawl 52 is prevented from disengaging upward from the guide rail 34.

The guide walls 60 and 62 are spaced from each other in the y-axis direction. A guide groove 74 extending in the x-axis direction is defined between the guide wall 60 and the guide wall 62.

Referring again to FIGS. 1 and 2, the clamp pawl 54 has the same configuration as the clamp pawl 52. Specifically, the clamp pawl 54 includes a clamp section 76 (second clamp section) extending in the x-axis direction, a recess 78 formed to be recessed inward from a bottom surface 76a of the clamp section 76, and a pair of guide walls 80 and 82 projecting upward from a top surface 76b of the clamp section 76 so as to be opposite to each other.

An inclined surface 76c is formed at the rear end of the clamp section 76 so as to be inclined with respect to the x-axis direction. As shown in FIG. 8, the recess 78 is defined, as in the recess 58, by the end face 64, the end faces 66 and 68, and the pawls 70 and 72. Further, a guide groove 90 extending in the x-axis direction is defined between the guide wall 80 and the guide wall 82.

When the clamp pawl 54 is disposed on the receiving base 12, as shown in FIG. 9, the guide rail 32 provided at the receiving base 12 is slidably received in the recess 78. At this time, the flanges 42 and 44 of the guide rail 32 engage the pawls 70 and 72 provided at the clamp pawl 54.

Due to this structure, the clamp pawl 54 is guided by the guide rail 32 so as to be able to move in the x-axis direction, while the clamp pawl 54 is prevented from disengaging upward from the guide rail 32.

With reference to FIG. 2, the first clamping mechanism 14 further includes biasing sections 84 and 86 (first biasing section). The biasing section 84 is interposed between the spring retaining section 38 of the receiving base 12 and the clamp pawl 52.

The biasing section 84 is, e.g., a coil spring, in which its front end is secured to the spring retaining section 38, while its rear end is secured to the front end of the clamp section 56. When the clamp pawls 52 and 54 are in a closed state, the biasing section 84 biases the clamp pawl 52 frontward (i.e., in the opening direction). The opening and closing operation of the clamp sections 56 and 76 will be described later.

The biasing section 86 is interposed between the spring retaining section 36 of the receiving base 12 and the clamp pawl 54. The biasing section 86 is, e.g., a coil spring, in which its rear end is secured to the spring retaining section 36, while its front end is secured to the rear end of the clamp section 76. When the clamp pawls 52 and 54 are in the closed state, the biasing section 86 biases the clamp pawl 54 frontward (i.e., in the opening direction).

Referring again to FIGS. 1 and 2, the second clamping mechanism 16 includes a pair of clamp pawls 92 and 94 arranged to align in the x-axis direction. The clamp pawls 92 and 94 are disposed on the top wall 28 so as to open and close. In this embodiment, the clamp pawls 92 and 94 are movable with respect to the top wall 28, and the clamp pawl 92 is disposed frontward of the clamp pawl 94.

Figure 10:
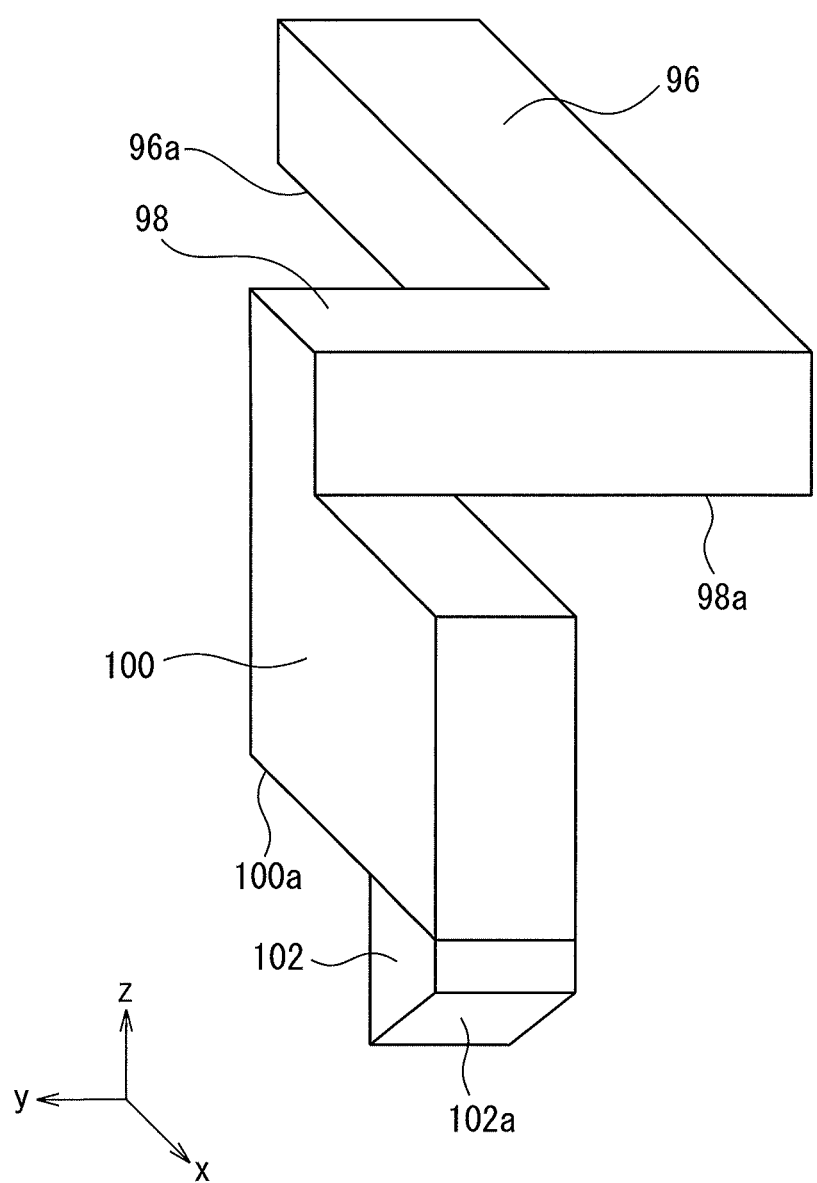
FIG. 10 is an enlarged perspective view of another pair of clamp pawls shown in FIG. 1.

As shown in FIGS. 1, 2, and 10, the clamp pawl 92 includes a clamp section 96 (third clamp section), a lateral block 98, a vertical block 100, and an engagement section 102. The clamp section 96 linearly extends in the x-axis direction.

The lateral block 98 projects rightward from the front end of the clamp section 96. The vertical block 100 is connected to a bottom surface 98a of the lateral block 98, and extends frontward from the lateral block 98. The engagement section 102 projects downward from a bottom surface 100a of the vertical block 100. The engagement section 102 has an inclined surface 102a inclined with respect to the x-axis.

Figure 11:
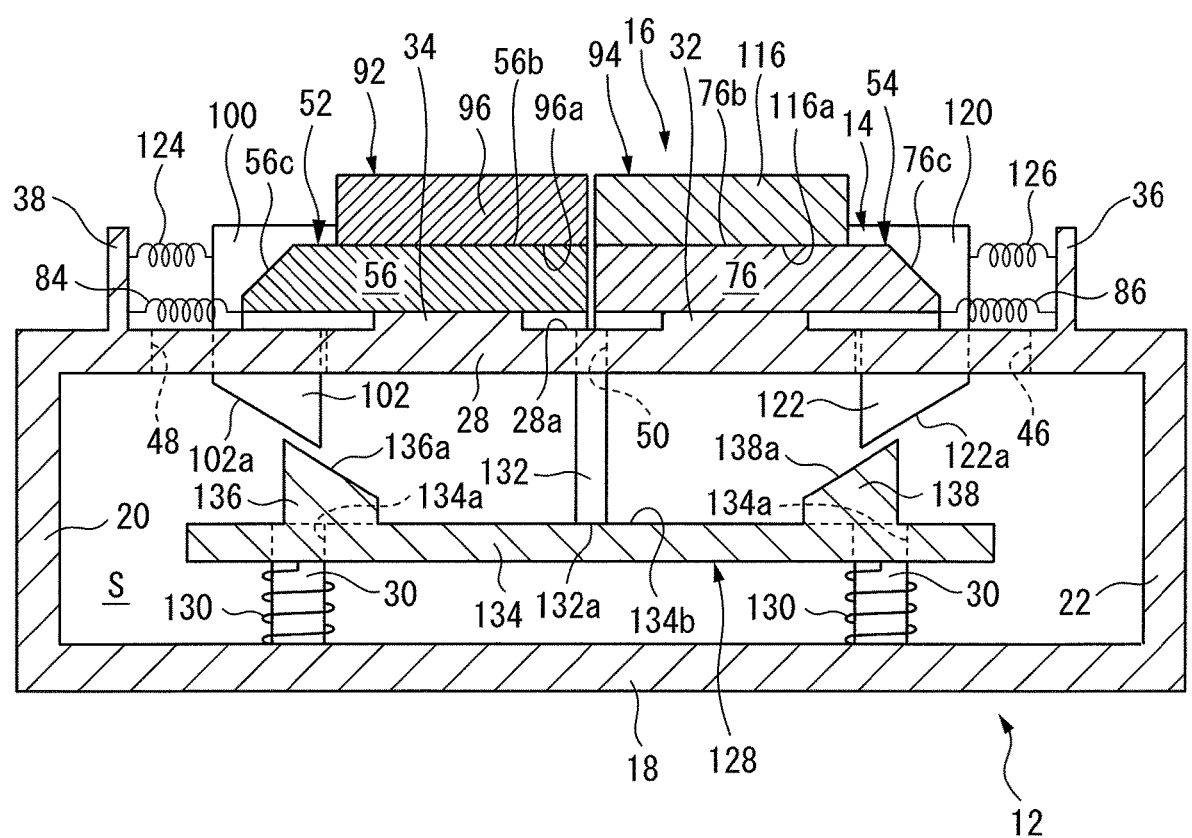
FIG. 11 is a cross-sectional view of the workpiece clamping device shown in FIG. 2 cut along XI-XI in FIG. 2.

As shown in FIGS. 1, 2, and 11, when the clamp pawl 92 is installed on the receiving base 12, the clamp section 96 is arranged on the clamp section 56 of the first clamping mechanism 14 so as to slidably contact the clamp section 56. At this time, the clamp section 96 is slidably received in the guide groove 74 provided at the clamp section 56, wherein a bottom surface 96a of the clamp section 96 contacts the top surface 56b of the clamp section 56.

By the guide groove 74 receiving the clamp section 96 in this way, the clamp pawl 92 engages the guide walls 60 and 62 defining the guide groove 74, and is guided by the guide walls 60 and 62 so as to move in the x-axis direction. Thus, in this embodiment, the guide groove 74 functions as a first guide configured to guide the movement of the clamp pawl 92 (i.e., the clamp section 96).

Further, as shown in FIG. 11, when the clamp pawl 92 is installed on the receiving base 12, the engagement section 102 of the clamp pawl 92 is received in the through-hole 48 formed at the top wall 28 of the receiving base 12, wherein the bottom end of the engagement section 102 projects into the internal space S of the receiving base 12.

With reference to FIGS. 1, 2, and 11, the clamp pawl 94 has the same configuration as the clamp pawl 92. Specifically, the clamp pawl 94 includes a clamp section 116 (fourth clamp section), a lateral block 118, a vertical block 120 and an engagement section 122 (FIG. 11). The clamp section 116 linearly extends in the x-axis direction.

The lateral block 118 projects leftward from the rear end of the clamp section 116. The vertical block 120 is connected to a bottom surface 118a (FIG. 1) of the lateral block 118, and extends rearward from the lateral block 118. The engagement section 122 projects downward from a bottom surface 120a of the vertical block 120. The engagement section 122 has an inclined surface 122a inclined with respect to the x-axis (FIG. 11).

When the clamp pawl 94 is installed on the receiving base 12, the clamp section 116 is arranged on the clamp section 76 of the first clamping mechanism 14 so as to slidably contact the clamp section 76. At this time, the clamp section 116 is slidably received in the guide groove 90 provided at the clamp section 76, wherein a bottom surface 116a (FIG. 11) of the clamp section 116 contacts the top surface 76b of the clamp section 76 (FIG. 11).

By the guide groove 90 receiving the clamp section 116 in this way, the clamp pawl 92 engages the guide walls 80 and 82 defining the guide groove 90, and is guided by guide walls 80 and 82 so as to move in the x-axis direction. Thus, in this embodiment, the guide groove 90 functions as a second guide configured to guide the movement of the clamp pawl 94 (i.e., the clamp section 116).

Further, as shown in FIG. 11, when the clamp pawl 94 is installed on the receiving base 12, the engagement section 122 of the clamp pawl 94 is received in the through-hole 46 formed at the top wall 28 of the receiving base 12, wherein the bottom end of the engagement section 122 projects into the internal space S of the receiving base 12.

As shown in FIGS. 2 and 11, the second clamping mechanism 16 further includes biasing sections 124 and 126 (second biasing section). The biasing section 124 is interposed between the spring retaining section 38 of the receiving base 12 and the vertical block 100 of the clamp pawl 92.

The biasing section 124 is, e.g., a coil spring, in which its front end is secured to the spring retaining section 38, while its rear end is secured to the front end of the vertical block 100. When the clamp pawls 92 and 94 are in the opened state, the biasing section 124 biases the clamp pawl 92 rearward (i.e., in the closing direction). Note that, the opening and closing operation of the clamp pawls 92 and 94 will be described later.

The biasing section 126 is interposed between the spring retaining section 36 of the receiving base 12 and the vertical block 120 of the clamp pawl 94. The biasing section 126 is, e.g., a coil spring, in which its rear end is secured to the spring retaining section 36, while its front end is secured to the rear end of the vertical block 120. When the clamp pawls 92 and 94 are in the opened state, the biasing section 126 biases the clamp pawl 94 frontward (i.e., in the closing direction).

As shown in FIG. 11, the second clamping mechanism 16 further includes a movement restriction section 128, biasing sections 130, and a handling section 132 (FIGS. 1, 2, and 11). The movement restriction section 128 is disposed in the internal space S of the receiving base 12, and includes a main body 134, and engagement sections 136 and 138.

The main body 134 is a flat plate member arranged substantially parallel to the x-y plane. A plurality of through-holes 134a are formed at the main body 134. The shafts 30 formed on the bottom wall 18 of the receiving base 12 are slidably received in the respective through-holes 134a. Due to this, the movement restriction section 128 can move in the z-axis direction while its movement in the x-axis and y-axis directions is restricted.

The engagement section 136 projects upward from a top surface 134b of the main body 134, and is arranged downward of the through-hole 48 formed at the top wall 28 of the receiving base 12. The engagement section 136 has an inclined surface 136a substantially parallel to the inclined surface 102a formed at the engagement section 102 of the clamp pawl 92.

The engagement section 138 projects upward from the top surface 134b of the main body 134, and is arranged downward of the through-hole 46 formed at the top wall 28 of the receiving base 12. The engagement section 138 has an inclined surface 138a substantially parallel to the inclined surface 122a formed at the engagement section 122 of the clamp pawl 94.

Each biasing section 130 is, e.g., a coil spring, and is interposed between the bottom wall 18 of the receiving base 12 and the main body 134 of the movement restriction section 128 so as to bias the movement restriction section 128 upward. The shafts 30 formed at the bottom wall 18 of the receiving base 12 are inserted into the respective biasing sections 130, thereby the biasing sections 130 are positioned at predetermined positions.

The handling section 132 is slidably inserted into the through-hole 50 formed at the top wall 28 of the receiving base 12, and its bottom end 132a contacts the top surface 134b of the main body 134 of the movement restriction section 128.

Figure 12:
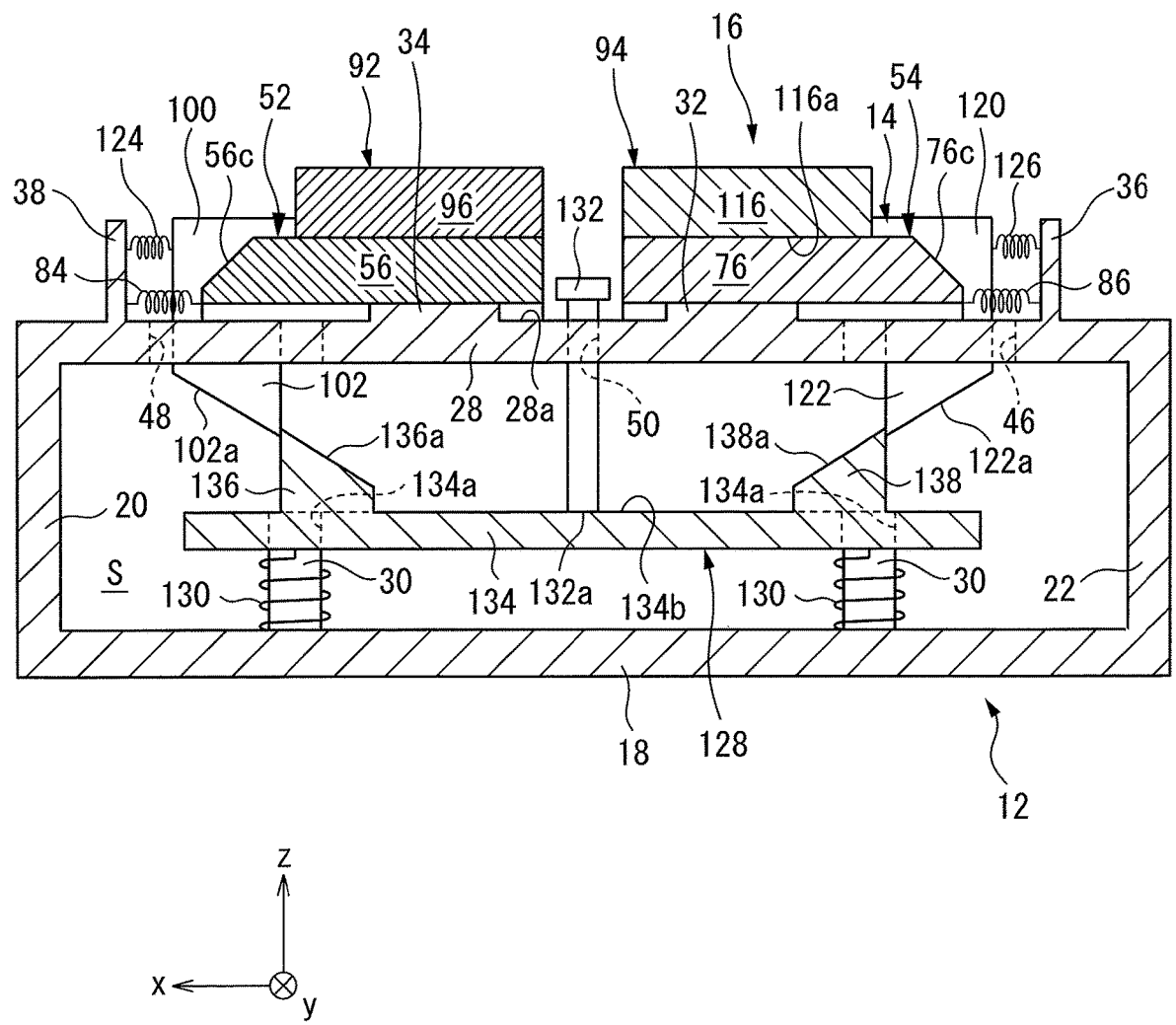
FIG. 12 is a cross-sectional view showing that the first clamping mechanism and the second clamping mechanism shown in FIG. 11 are brought into an opened state.

Next, the opening and closing operation of the clamp pawls 52 and 54, and the opening and closing operation of the clamp pawls 92 and 94 will be described. FIGS. 1, 2, and 11 show that the clamp pawls 52 and 54 and the clamp pawls 92 and 94 are in the closed state. On the other hand, FIG. 12 shows that the clamp pawls 52 and 54 and the clamp pawls 92 and 94 are in the opened state.

As described above, the clamp pawls 52 and 54 are respectively biased in the opening direction by the biasing sections 84 and 86. Therefore, when the clamp pawls 52 and 54 are in the opened state shown in FIG. 12, the biasing force applied to the clamp pawls 52 and 54 by the biasing sections 84 and 86 is substantially zero (or is small enough to ignore).

When the clamp pawl 52 is brought into the closed state shown in FIG. 11 from the opened state shown in FIG. 12, a first pressing section of a machine tool, which will be described later, is pressed downward against the inclined surface 56c formed at the clamp section 56.

Then, a force component for pushing the clamp section 56 rearward is generated from the external force applied from the first pressing section to the inclined surface 56c, and by the action of this force component, the clamp section 56 is moved rearward (i.e., in the closing direction) against a biasing force of the biasing section 84, while being guided by the guide rail 34. Thus, in this embodiment, the inclined surface 56c constitutes a cam mechanism configured to move the clamp section 56 in the closing direction by the external force applied to the clamp section 56.

Similarly, when the clamp pawl 54 is brought into the closed state shown in FIG. 11 from the opened state shown in FIG. 12, a second pressing section of the machine tool, which will be described later, is pressed downward against the inclined surface 76c formed at the clamp section 76.

Then, a force component for pushing the clamp section 76 frontward is generated from the external force applied from the second pressing section to the inclined surface 76c, and by the action of this force component, the clamp section 76 is moved frontward (i.e., in the closing direction) against a biasing force of the biasing section 86, while being guided by the guide rail 32.

Thus, the inclined surface 76c constitutes a cam mechanism configured to move the clamp section 76 in the closing direction by the external force applied to the clamp section 76. In this way, the clamp pawls 52 and 54 are brought into the closed state.

On the other hand, the clamp pawls 92 and 94 are respectively biased in the closing direction by the biasing sections 124 and 126, as described above. Therefore, when the clamp pawls 92 and 94 are in the closed state shown in FIG. 11, the biasing force applied from the biasing sections 124 and 126 to the clamp pawls 92 and 94 respectively is substantially zero (or is small enough to ignore).

Note that, in this embodiment, when the clamp pawls 92 and 94 are in the closed state, a gap is formed between the clamp pawl 92 and the clamp pawl 94. The function of this gap will be described later.

When the clamp pawl 92 is brought into the opened state shown in FIG. 12 from the closed state shown in FIG. 11, an operator or robot (not shown) pushes the clamp pawl 92 frontward (i.e., in the opening direction) against the biasing force of the biasing section 124.

By this, the clamp pawl 92 moves frontward from the position shown in FIG. 11 while being guided by the guide groove 74 formed at the clamp section 56. In this respect, the inclined surface 102a formed on the engagement section 102 of the clamp pawl 92 is substantially parallel to the inclined surface 136a formed on the engagement section 136 of the movement restriction section 128.

Therefore, when the clamp pawl 92 is moved frontward from the position shown in FIG. 11, the inclined surface 102a pushes the inclined surface 136a downward while the inclined surface 102a slides on the inclined surface 136a. Due to this, the movement restriction section 128 is slightly displaced downward against the biasing force of the biasing sections 130, as a result of which, the engagement section 102 can pass over the engagement section 136.

When the engagement section 102 passes the engagement section 136, the movement restriction section 128 returns to the initial upper position by the biasing force of the biasing sections 130. Then, as shown in FIG. 12, the engagement section 102 engages the engagement section 136, thereby the movement of the clamp pawl 92 in the rearward direction (i.e., in the closing direction) is restricted.

Similarly, when the clamp pawl 94 is brought into the opened state shown in FIG. 12 from the closed state shown in FIG. 11, the operator or robot (not shown) pushes the clamp pawl 94 rearward (i.e., in the opening direction) against the biasing force of the biasing section 126.

Then, the clamp pawl 94 moves rearward from the position shown in FIG. 11 while being guided by the guide groove 90 formed at the clamp section 76. In this respect, the inclined surface 122a formed on the engagement section 122 of the clamp pawl 94 is substantially parallel to the inclined surface 138a formed on the engagement section 138 of the movement restriction section 128.

Accordingly, when the clamp pawl 94 is moved rearward from the position shown in FIG. 11, the inclined surface 122a pushes the inclined surface 138a downward while the inclined surface 122a slides on the inclined surface 138a. Due to this, the movement restriction section 128 is slightly displaced downward, as a result of which, the engagement section 122 can pass over the engagement section 138.

When the engagement section 122 passes the engagement section 138, the movement restriction section 128 returns to the initial upper position by the biasing force of the biasing sections 130. Then, as shown in FIG. 12, the engagement section 122 engages the engagement section 138, thereby the movement of the clamp pawl 94 in the frontward direction (i.e., the closing direction) is restricted. In this way, the clamp pawls 92 and 94 are maintained in the opened state.

On the other hand, when the clamp pawls 92 and 94 are brought into the closed state shown in FIG. 11 from the opened state shown in FIG. 12, the operator or robot (not shown) pushes the handling section 132 downward. As described above, the bottom end 132a of the handling section 132 contacts the top surface 134b of the movement restriction section 128. Therefore, when the handling section 132 is pressed downward, the movement restriction section 128 is also moved downward against the biasing force of the biasing sections 130.

Then, the engagement sections 136 and 138 respectively disengage from the engagement sections 102 and 122, and thus, the engagement between the engagement section 102 and the engagement section 136 and the engagement between the engagement section 122 and the engagement section 138 are released. Thereby, the clamp pawls 92 and 94 moves in the closing direction by the biasing force of the biasing sections 124 and 126, so as to be brought into the closed state shown in FIG. 11.

Figure 13:
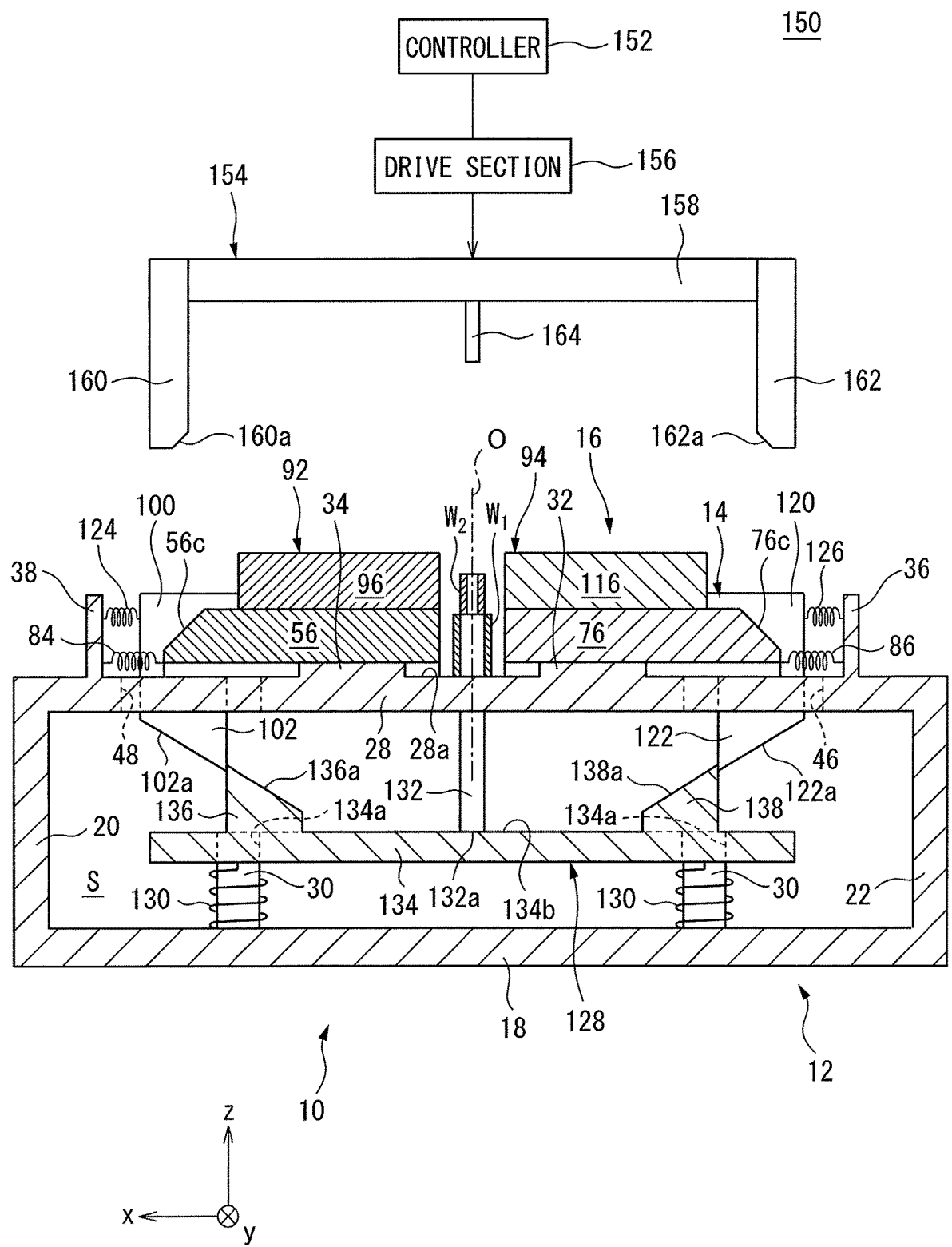
FIG. 13 is a view of a machine tool according to an embodiment.

Next, with reference to FIGS. 13 and 14, a machine tool 150 according to an embodiment will be described. The machine tool 150 is for press-fitting a second workpiece $W_2$ into a first workpiece $W_1$. The first workpiece $W_1$ and the second workpiece $W_2$ are placed on the top surface 28a of the receiving base 12 so as to be substantially coaxial with an axis O.

Note that, the axis O is a virtual axis extending in the z-axis direction, which is arranged between the clamp sections 56 and 76 (the clamp sections 96 and 116) in the opened state at a position separated from the respective clamp sections 56 and 76 (the clamp sections 96 and 116) by a substantially equal distance.

Figure 14:
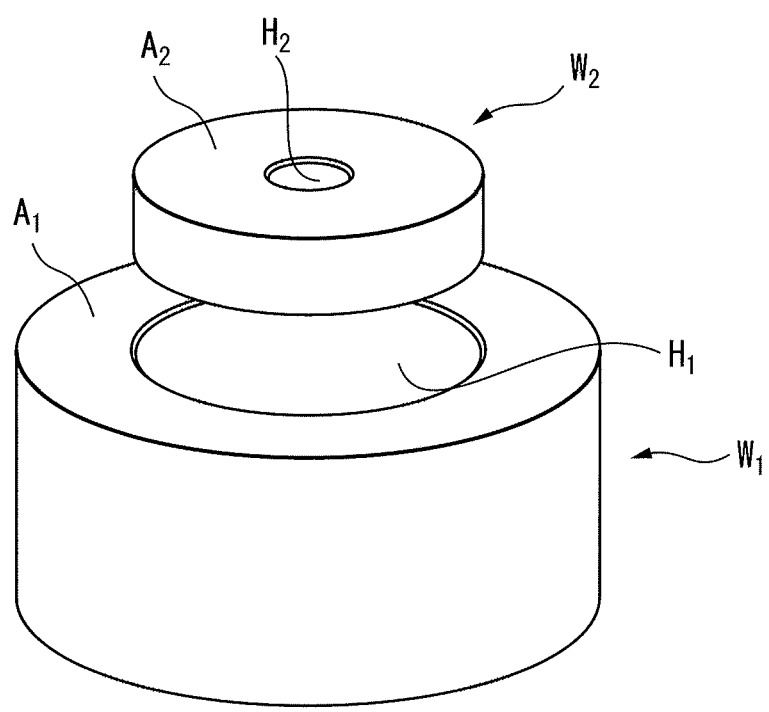
FIG. 14 is a perspective view of a first workpiece and a second workpiece according to an embodiment.

As shown in FIG. 14, in this embodiment, the first workpiece $W_1$ is a cylindrical member with a bottom, and includes a hole $H_1$ recessed inward from its top surface $A_1$. The second workpiece $W_2$ is a cylindrical member having an outer diameter equal to or larger than the inner diameter of the first workpiece $W_1$, and includes a hole $H_2$ recessed downward from its top surface $A_2$. When the second workpiece $W_2$ is press-fit into the first workpiece $W_1$, the second workpiece $W_2$ is placed on the first workpiece $W_1$ as shown in FIG. 13.

Referring again to FIG. 13, the machine tool 150 includes a controller 152, a press tool 154, a drive section 156, and the above-described workpiece clamping device 10.

The press tool 154 includes a base 158, a first pressing section 160, a second pressing section 162, and a third pressing section 164. The first pressing section 160 projects downward from the front end of the base 158.

The first pressing section 160 is formed with an inclined surface 160a substantially parallel to the inclined surface 56c formed on the clamp section 56. The inclined surface 160a is arranged upward of the inclined surface 56c of the clamp section 56 in the opened state.

The second pressing section 162 projects downward from the rear end of the base 158. The second pressing section 162 is formed with an inclined surface 162a substantially parallel to the inclined surface 76c formed on the clamp section 76. The inclined surface 162a is arranged upward of the inclined surface 76c of the clamp section 76 in the opened state. The third pressing section 164 projects downward from the center of the base 158, and is arranged to be substantially coaxial with the axis O.

The drive section 156 includes e.g. a hydraulic or pneumatic cylinder, and is configured to move the press tool 154 in the z-axis direction in accordance with a command from the controller 152. The controller 152 transmits a command to the drive section 156 so as to move the press tool 154 in the z-axis direction by the drive section 156.

Figure 15:
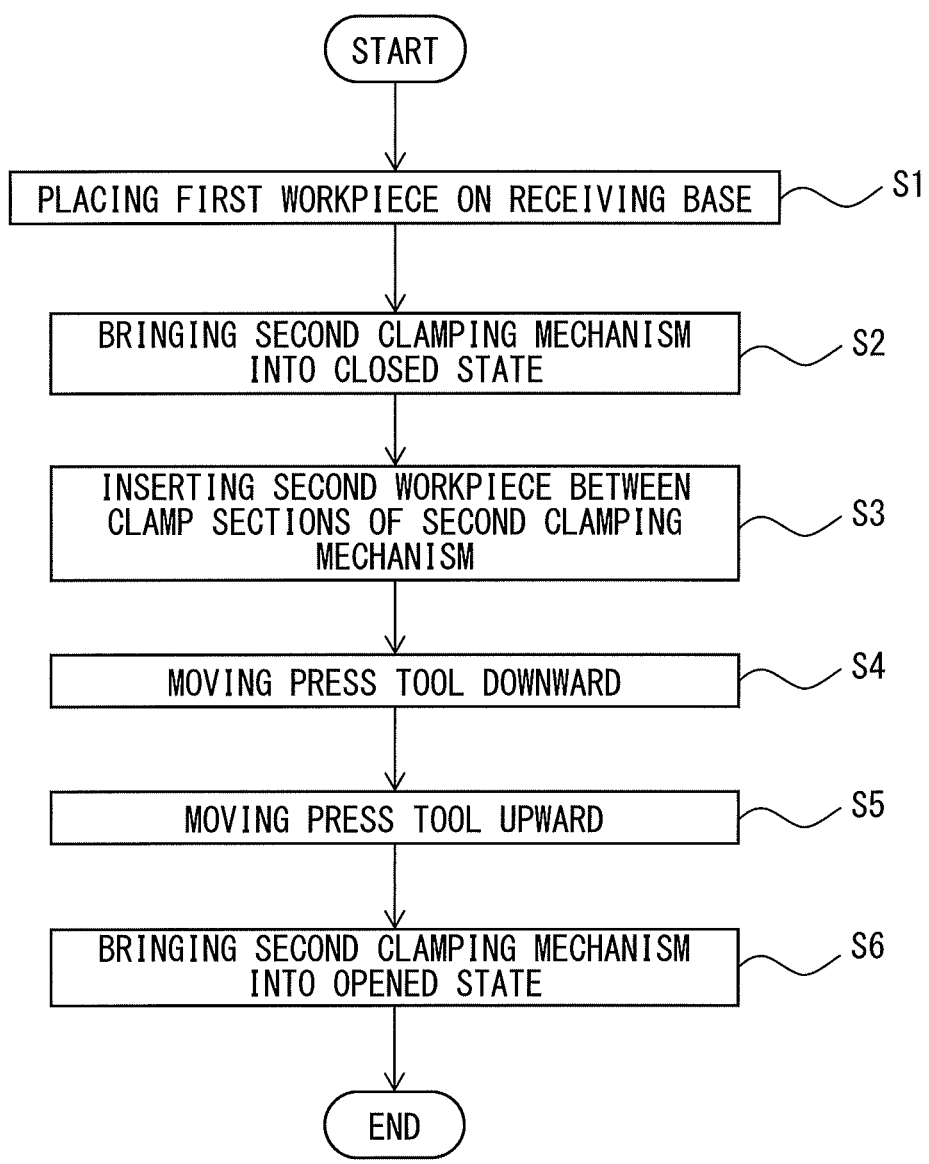
FIG. 15 is a flowchart of a method for press-fitting the second workpiece into the first workpiece with using the machine tool shown in FIG. 13.

Next, with reference to FIG. 15, a method of press-fitting the second workpiece $W_2$ into the first workpiece $W_1$ with using the machine tool 150 will be described. When the flow shown in FIG. 15 is started, the first clamping mechanism 14 and the second clamping mechanism 16 are set in the opened state shown in FIG. 12.

At step S1, the operator or robot places the first workpiece $W_1$ on the receiving base 12. Specifically, the operator or robot places the first workpiece $W_1$ on the top surface 28a of the receiving base 12 so as to be substantially coaxial with the axis O.

Note that, at step S1, it is not necessary to strictly position the first workpiece $W_1$ to be coaxial with the axis O, and the operator or robot may place the first workpiece $W_1$ at any position between the clamp sections 56 and 76 in the opened state.

At step S2, the operator or robot brings the second clamping mechanism 16 into the closed state. Specifically, the operator or robot pushes the handling section 132 of the second clamping mechanism 16 downward.

As a result, the engagement sections 136 and 138 of the movement restriction section 128 simultaneously disengage from the engagement sections 102 and 122, thereby the clamp pawls 92 and 94 move in the closing direction. At this time, the clamp pawls 92 and 94 move toward the axis O in synchronization with each other so as to be symmetrical to each other with respect to the axis O. Consequently, the clamp pawls 92 and 94 are brought into the closed state.

At step S3, the operator or robot inserts the second workpiece $W_2$ between the clamp sections 96 and 116. As described above, a gap is formed between the clamp sections 96 and 116 in the closed state.

At this step S3, the operator or robot inserts the second workpiece $W_2$ into the gap between the clamp sections 96 and 116. At this time, the second workpiece $W_2$ is placed on the top surface $A_1$ of the first workpiece $W_1$ so as to be substantially coaxial with the axis O.

Figure 16:
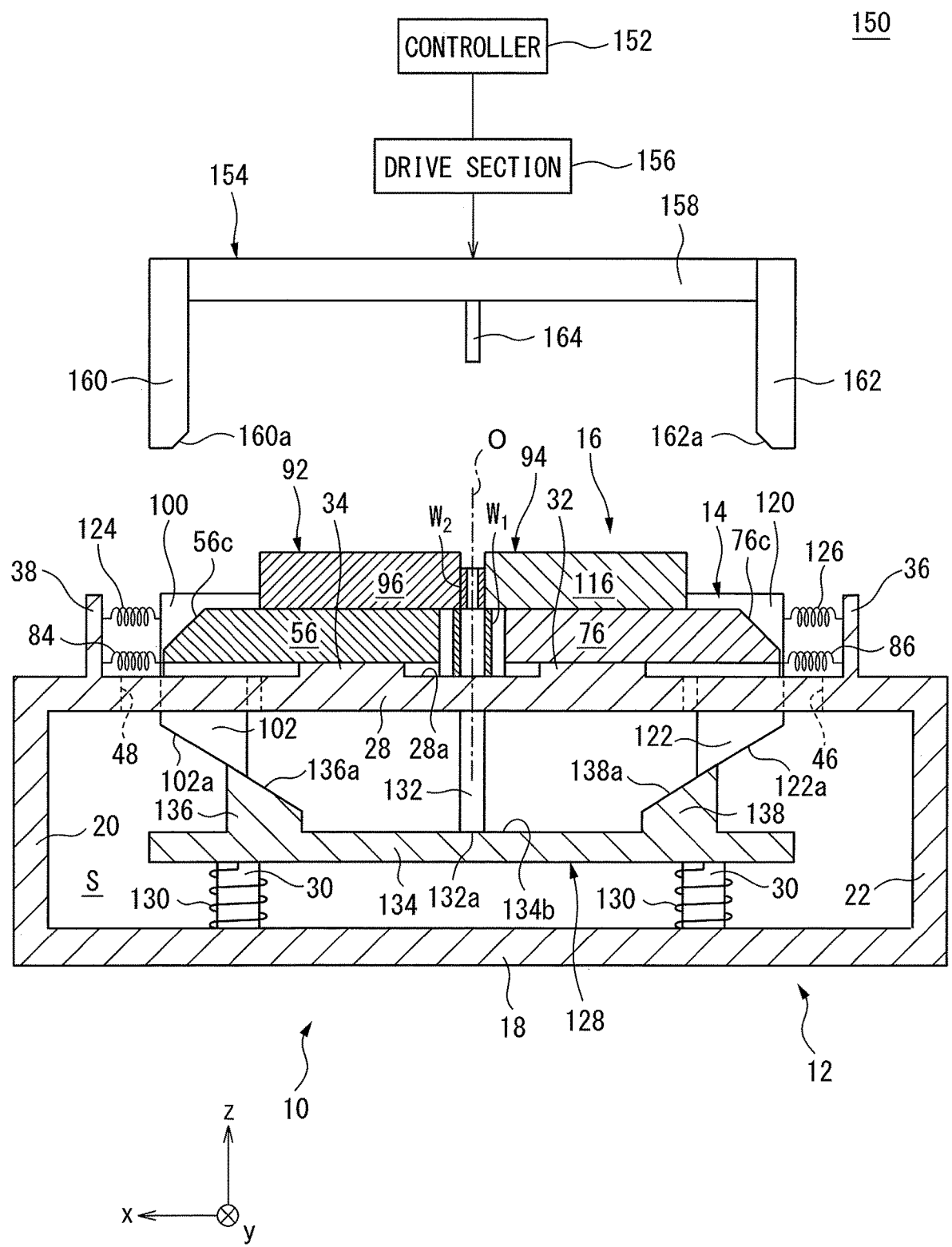
FIG. 16 is a cross-sectional view of the workpiece clamping device, the first workpiece, and the second workpiece at the end of step S2 in FIG. 15.

Consequently, as shown in FIG. 16, the first workpiece $W_1$ is disposed between the clamp sections 56 and 76, while the second workpiece $W_2$ is clamped between the clamp sections 96 and 116 and retained at a position above the hole $H_1$ formed in the first workpiece $W_1$.

Figure 17:
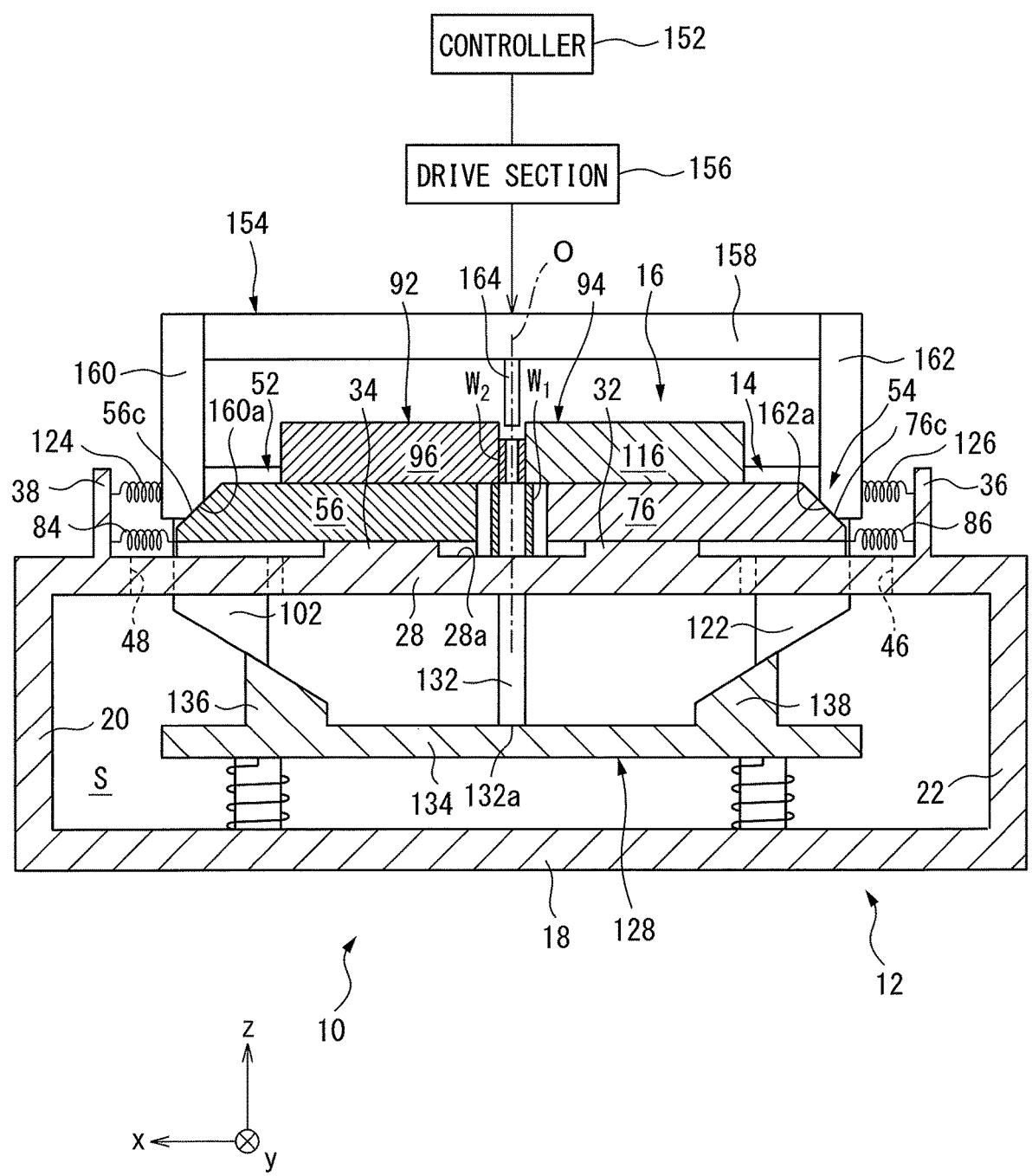
FIG. 17 is a cross-sectional view showing that an inclined surface of a pressing section contacts an inclined surface of the clamp section at step S3 in FIG. 15.

At step S4, the controller 152 transmits a command to the drive section 156 so as to move the press tool 154 downward. When the press tool 154 is moved downward, as shown in FIG. 17, the inclined surface 160a of the first pressing section 160 contacts the inclined surface 56c of the clamp section 56. Further, the inclined surface 162a of the second pressing section 162 contacts the inclined surface 76c of the clamp section 76, concurrently with the inclined surface 160a contacting the inclined surface 56c.

As the press tool 154 is further moved downward from the position shown in FIG. 17, the clamp section 56 is moved rearward by the external force applied from the inclined surface 160a to the inclined surface 56c. In synchronization with this movement, the clamp section 76 is moved frontward by the external force applied from the inclined surface 162a to the inclined surface 76c.

By the external force applied to the inclined surfaces 56c and 76c, the clamp sections 56 and 76 move toward the axis O in synchronization with each other so as to be symmetric to each other with respect to the axis O. Consequently, as shown in FIG. 18, the first workpiece $W_1$ is clamped between the clamp section 56 and the clamp section 76.

At this time, the bottom end of the third pressing section 164 of the press tool 154 contact a top surface $A_2$ of the second workpiece $W_2$, or is slightly separated upward from the top surface $A_2$. Further, since the clamp section 56 engages the first pressing section 160 at its front end, the movement of the clamp section 56 in the frontward direction (i.e., the opening direction) is restricted. Similarly, since the clamp section 76 engages the second pressing section 162 at its rear end, the movement of the clamp section 76 in the rearward direction (i.e., the opening direction) is restricted.

Figure 18:
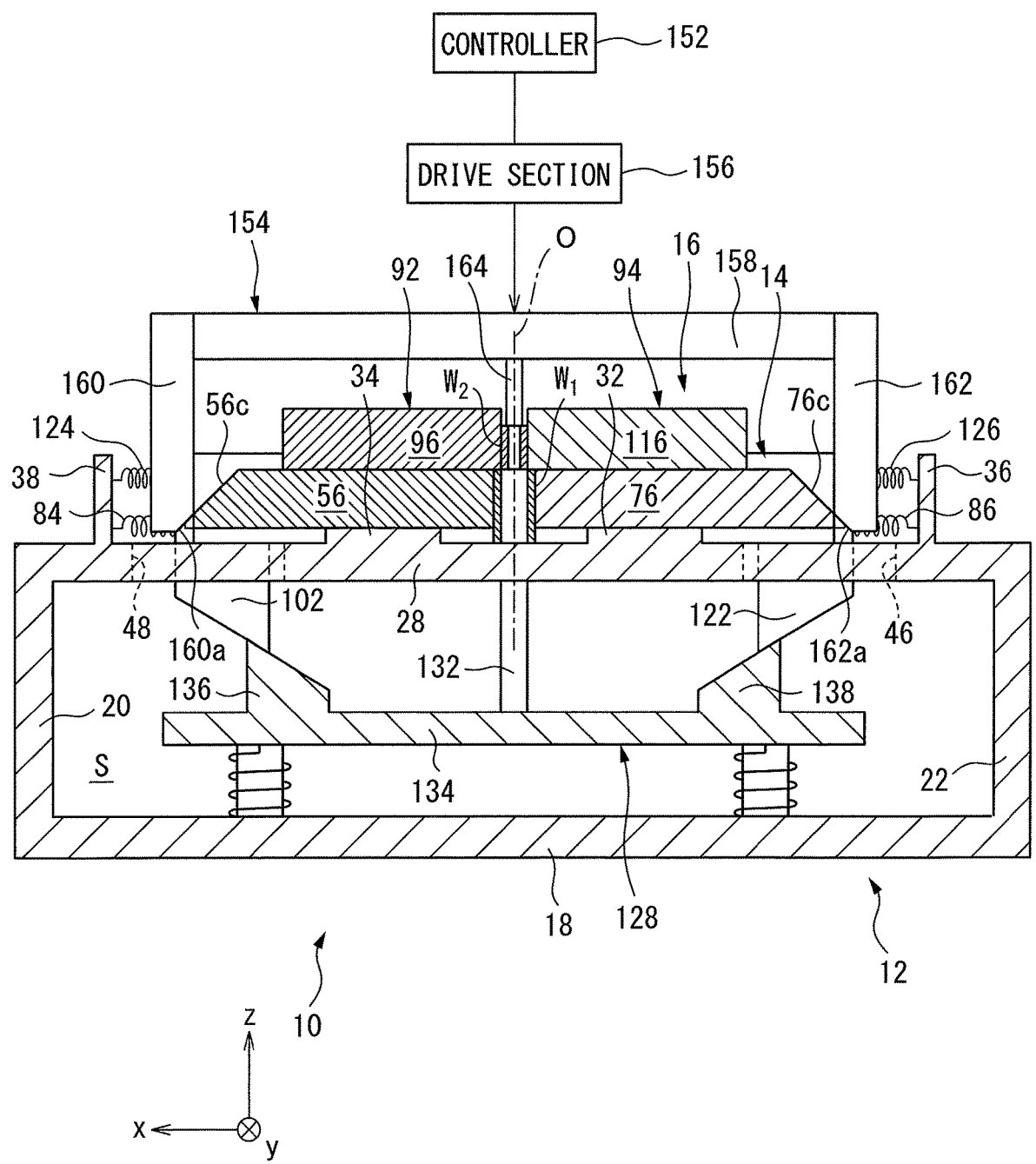
FIG. 18 is a sectional view showing that the first workpiece is clamped at step S3 in FIG. 15.

When the press tool 154 is further moved downward from the position shown in FIG. 18, the third pressing section 164 abuts against the top surface $A_2$ of the second workpiece $W_2$ and pushes the second workpiece $W_2$ downward. Due to this, the second workpiece $W_2$ is press-fit into the hole $H_1$ of the first workpiece $W_1$.

In this respect, the clamp pawls 92 and 94 are biased in the closing direction by the biasing force of the biasing sections 124 and 126. If a force larger than the biasing force of biasing sections 124 and 126 is applied to the clamp pawls 92 and 94 in a direction opposite to the direction of the biasing force, the clamp pawls 92 and 94 can move in the opening direction.

Accordingly, when the third pressing section 164 pushes the second workpiece $W_2$ downward at this step S4, the clamp pawls 92 and 94 can be displaced in the opening direction so as to allow the downward movement of the second workpiece $W_2$.

On the other hand, the clamp pawls 52 and 54 engage the first pressing section 160 and the second pressing section 162, by which, the movement of the clamp pawls 52 and 54 in the opening direction is restricted. Therefore, when the third pressing section 164 pushes the second workpiece $W_2$ downward at this step S4, the clamp pawls 52 and 54 cannot be displaced in the opening direction, and firmly clamp the first workpiece $W_1$ therebetween. Due to this configuration, it is possible to reliably press-fit the second workpiece $W_2$ into the hole $H_1$ of the first workpiece $W_1$.

At step S5, the controller 152 transmits a command to the drive section 156 so as to move the press tool 154 upward. Then, the first pressing section 160 and the second pressing section 162 are respectively spaced upward from the clamp sections 56 and 76, thereby the clamp pawls 52 and 54 is moved in the opening direction by the action of the biasing sections 84 and 86. Consequently, the clamp pawls 52 and 54 return to the opened state shown in FIG. 16.

At step S6, the operator or robot brings the second clamping mechanism 16 into the opened state. Specifically, the operator or robot pushes the clamp pawls 92 and 94 in the opening direction against the biasing force of the biasing sections 124 and 126.

Then, the engagement section 102 of the clamp pawl 92 and the engagement section 122 of the clamp pawl 94 respectively engage the engagement sections 136 and 138 of the movement restriction section 128, thereby the movement of the clamp pawls 92 and 94 in the closing direction is restricted. In this way, the clamp pawls 92 and 94 are maintained in the opened state.

As described above, in this embodiment, the clamp sections 56 and 76 able to clamp the first workpiece $W_1$, and the clamp sections 96 and 116 able to clamp the second workpiece $W_2$ placed on the first workpiece $W_1$ are provided on one receiving base 12.

According to this configuration, it is possible to consecutively clamp two workpieces $W_1$ and $W_2$ disposed so as to be stacked on another by one workpiece clamping device 10. Accordingly, the cycle time of operation can be reduced. Further, since it is not necessary to provide two workpiece clamping devices for respectively clamping two workpieces $W_1$ and $W_2$, the number of components of the machine tool 150 can be reduced.

Further, in this embodiment, the clamp section 96 is disposed so as to slidably contact the clamp section 56, and the clamp section 116 is disposed so as to slidably contact the clamp section 76.

According to this configuration, the clamp section 96 and the clamp section 56, and the clamp section 116 and the clamp section 76 can be more compactly arranged, and accordingly, it is possible to downsize the workpiece clamping device 10.

Further, in this embodiment, the clamp section 96 is guided by the guide groove 74 formed at the clamp section 56, and the clamp section 116 is guided by the guide groove 90 formed at the clamp section 76. According to this configuration, it is possible to stably open and close the clamp sections 96 and 116 along a predetermined track.

Further, in this embodiment, the clamp pawls 92 and 94 are respectively moved in the closing direction by the actions of the biasing sections 124 and 126, and kept in the opened state by the movement restriction section 128.

According to this configuration, it is possible to open and close the clamp pawls 92 and 94 by e.g. a robot. Therefore, the clamping operation by the workpiece clamping device 10 can be automated.

Further, the workpiece clamping device 10 includes the handling section 132. According to this configuration, it is possible to easily bring the clamp pawls 92 and 94 into the opened state by e.g. a robot.

Further, in this embodiment, the clamp pawls 52 and 54 is respectively moved in the opening direction by the action of the biasing sections 84 and 86. According to this configuration, it is possible to automatically return the clamp pawls 52 and 54 to the opened state, only by moving the press tool 154 upward at step S4. Therefore, the clamping operation by the workpiece clamping device 10 can be automated.

Figure 19A:
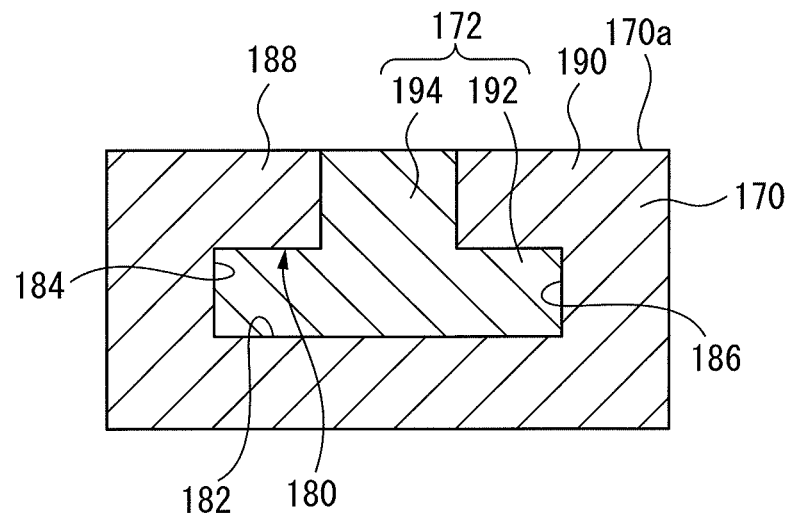
FIG. 19A is a cross-sectional view of a clamp section according to another embodiment.
Figure 19B:
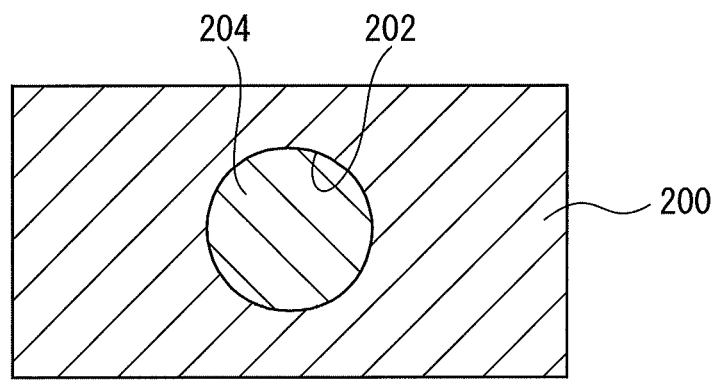
FIG. 19B is a cross-sectional view of a clamp section according to still another embodiment.

Note that, various embodiment can be applied as a guide structure for guiding the movement of the clamp sections 96 and 116. With reference to FIGS. 19A and 19B, a clamp section according to another embodiment will be described below.

A clamp section 170 shown in FIG. 19A can be applied to the first clamping mechanism 14 in place of the clamp section 56 or 76. The clamp section 170 extends in the x-axis direction, and includes a recess 180 recessed inward from its top surface 170a.

The recess 180 is defined by a bottom surface 182, side surfaces 184 and 186 extending upward from the bottom surface 182 so as to be opposite to each other, and flanges 188 and 190 respectively projecting inward from the side surfaces 184 and 186.

A clamp section 172 shown in FIG. 19A can be applied to the second clamping mechanism 16 in place of the clamp section 96 or 116. The clamp section 172 includes a base 192 extending in the x-axis direction, and a protrusion 194 extending upward from the base 192 and extending in the x-axis direction.

The clamp section 172 is slidably received in the recess 180 formed in the clamp section 170. In this state, the base 192 of the clamp section 172 engages the flanges 188 and 190 of the clamp section 170.

Due to this configuration, the clamp section 172 is guided by the recess 180 to move in the x-axis direction, while being prevented from disengaging upward from the clamp section 170. Thus, in this embodiment, the recess 180 functions as a guide configured to guide the movement of the clamp section 172.

A clamp section 200 shown in FIG. 19B can be applied to the first clamping mechanism 14 in place of the clamp section 56 or 76. The clamp section 200 includes a hole 202 extending in the x-axis direction.

A clamp section 204 shown in FIG. 19B can be applied to the second clamping mechanism 16 in place of the clamp section 96 or 116. The clamp section 204 is a substantially circular rod, and is slidably received in the hole 202 formed in the clamp section 200.

Due to this configuration, the clamp section 204 is guided by the hole 202 to move in the x-axis direction, while being prevented from disengaging upward from the clamp section 200. Thus, in this embodiment, the hole 202 functions as a guide configured to guide the movement of the clamp section 204.

In the above-described embodiments, both of the clamp pawls 52 and 54 are movable with respect to the receiving base 12. However, the clamp pawls 52 and 54 may be configured so that one of them is immovably secured on the receiving base 12 while the other can move toward and away from the secured one.

Similarly, the clamp pawls 92 and 94 may be configured so that one of them is immovably secured on the receiving base 12 while the other can move toward and away from the secured one. In this case, the movement restriction section 128 has only an engagement section (136 or 138) which engages the other clamp pawl.

The above-mentioned inclined surfaces 56c and 76c may be formed at the clamp pawls 92 and 94 respectively, wherein the pressing sections 160 and 162 of the machine tool 150 may be respectively pressed against these inclined surfaces 56c and 76c so as to move the clamp pawls 92 and 94 in the closing direction.

In this case, the biasing sections 84 and 86 for biasing the clamp pawls 92 and 94 in the opening direction are respectively secured to the clamp pawls 92 and 94, instead of the biasing sections 124 and 126.

Further, recesses may be formed at the opposed surfaces of the clamp sections 96 and 116 in order to facilitate to clamp the second workpiece $W_2$. With reference to FIGS. 20A and 20B, variations of the clamp sections 96 and 116 will be described below.

In the variation shown in FIG. 20A, a clamp section 96' includes a recess 206 formed at its rear end surface. On the other hand, a clamp section 116' includes a recess 208 formed at its front end surface. Each of the recesses 206 and 208 is defined by two planes substantially orthogonal to each other.

When the clamp sections 96' and 116' are brought into closed state, a gap of a substantially quadrangular shape as seen from the z-axis direction is formed between the clamp sections 96' and 116' by the recesses 206 and 208.

In this variation, at step S3 in FIG. 15, the second workpiece $W_2$ is inserted into this quadrangular gap. At this time, the second workpiece $W_2$ engages the wall surfaces which define the recesses 206 and 208, and is stably clamped by the clamp sections 96' and 116'.

In the variation shown in FIG. 20B, a clamp section 96" includes a recess 210 formed at its rear end surface. On the other hand, a clamp section 116" includes a recess 212 formed at its front end surface. Each of the recesses 210 and 212 is defined by an arc surface.

When the clamp sections 96" and 116" are brought into the closed state, a gap of a substantially circular shape as seen from the z-axis direction is formed between the clamp sections 96" and 116" by the recesses 210 and 212.

In this variation, at step S3 in FIG. 15, the second workpiece $W_2$ is inserted into this circular gap. At this time, the second workpiece $W_2$ engages the wall surfaces which define the recesses 210 and 212, and is stably clamped by the clamp sections 96" and 116".

Note that, recesses such as the above-mentioned recesses 206 and 208 or the recesses 210 and 212 may be respectively formed at the opposed surfaces of the clamp pawls 52 and 54, in order to facilitate to clamp the first workpiece $W_1$.

Further, the biasing sections 124 and 126 for biasing the clamp pawls 52 and 54 in the closing direction may be respectively secured to the clamp pawls 52 and 54, instead of the biasing sections 84 and 86, wherein the engagement sections 102 and 122 may be respectively provided at the clamp pawls 52 and 54. In this case, the movement restriction section 128 is configured to disengageably engage the engagement sections 102 and 122 formed at the clamp pawls 52 and 54.

Further, the first clamping mechanism 14 may further includes an interlocking mechanism configured to interlock the opening and closing movement of the clamp pawl 52 with the opening and closing movement of the clamp pawl 54. Such an interlocking mechanism can be implemented by e.g. a rack-and-pinion mechanism. In this case, the biasing section 84 or 86 can be omitted.

Similarly, the second clamping mechanism 16 may further include an interlocking mechanism configured to interlock the opening and closing movement of the clamp pawl 92 with the opening and closing movement of the clamp pawl 94. In this case, the biasing section 124 or 126 can be omitted.

Although the invention has been described above through various embodiments, the embodiments do not limit the inventions according to the claims. Further, a configuration obtained by combining the features described in the embodiments of the invention can be included in the technical scope of the invention. However, all combinations of these features are not necessarily essential for solving means of the invention. Furthermore, it is obvious for a person skilled in the art that various modifications or improvements can be applied to the embodiments.

Regarding the order of operations, such as actions, sequences, steps, processes, and stages, in the devices, systems, programs, and methods indicated in the claims, specification and drawings, it should be noted that the terms "before", "prior to", etc. are not explicitly described, and any order can be realized unless the output of a previous operation is used in the subsequent operation. Regarding the processing in the claims, specification, and drawings, even when the order of operations is described using the terms "first", "next", "subsequently", "then", etc., for convenience, maintaining this order is not necessarily essential for working the inventions.

The invention claimed is:

1. A workpiece clamping device comprising:
   a receiving base on which a first workpiece is placed;
   a first clamping mechanism configured to clamp the first workpiece placed on the receiving base, and including a first clamp section and a second clamp section which are provided at the receiving base so as to open and close in a first-axis direction and which can clamp the first workpiece; and
   a second clamping mechanism configured to clamp a second workpiece placed on the first workpiece, and including:
   a third clamp section and a fourth clamp section which are provided at the receiving base so as to open and close in the first-axis direction independently from the opening and the closing of the first clamp section and the second clamp section of the first clamping mechanism, and which can clamp the second workpiece; and a second biasing section interposed between the receiving base and at least one of the third clamp section and the fourth clamp section, and configured to bias the at least one of the third clamp section and the fourth clamp section in a closing direction, wherein the second clamping mechanism retaining the second workpiece at a position with respect to the first workpiece.

2. The workpiece clamping device according to claim 1, wherein the third clamp section is disposed so as to slidably contact the first clamp section during the opening and closing of the third clamp section.

3. The workpiece clamping device according to claim 2, wherein the first clamping mechanism includes a guide (74) provided at the first clamp section and configured to engage the third clamp section so as to guide the movement of the third clamp section.

4. The workpiece clamping device according to claim 3, wherein the guide includes a groove slidably receiving the third clamp section.

5. The workpiece clamping device according to claim 1, wherein the first clamping mechanism further includes a first biasing section configured to bias at least one of the first clamp section and the second clamp section in an opening direction.

6. The workpiece clamping device according to claim 5, further comprising a cam mechanism configured to move the first clamp section or the second clamp section biased by the first biasing section in a closing direction, by an external force applied to the first clamp section or the second clamp section in a direction intersecting with the opening and closing direction of the first clamp section or the second clamp section.

7. The workpiece clamping device according to claim 6, wherein the cam mechanism includes an inclined surface formed at the first clamp section or the second clamp section biased by the first biasing section so as to be inclined with respect to the opening and closing direction of the first clamp section or the second clamp section.

8. The workpiece clamping device according to claim 1, wherein the second clamping mechanism further includes:
a movement restriction section configured to disengageably engage the third clamp section or the fourth clamp section biased by the second biasing section when the third clamp section and the fourth clamp section are opened, the movement restriction section restricting the movement of the third clamp section or the fourth clamp section in the closing direction when engaging the third clamp section or the fourth clamp section, while allowing the third clamp section or the fourth clamp section to move in the closing direction by the action of the second biasing section when disengaging from the third clamp section or the fourth clamp section.

* * * * *